Figure 6:
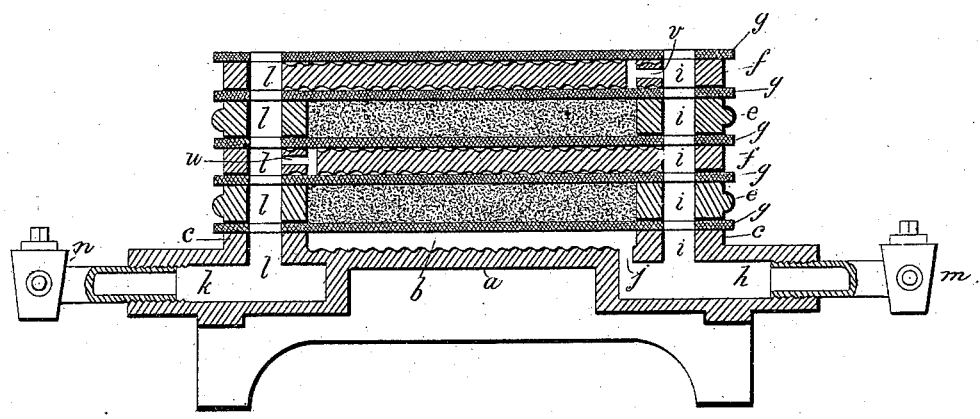

(No Model.) 2 Sheets—Sheet 1.
J. JOHNSON.
WATER FILTER.
No. 294,133. Patented Feb. 26, 1884.
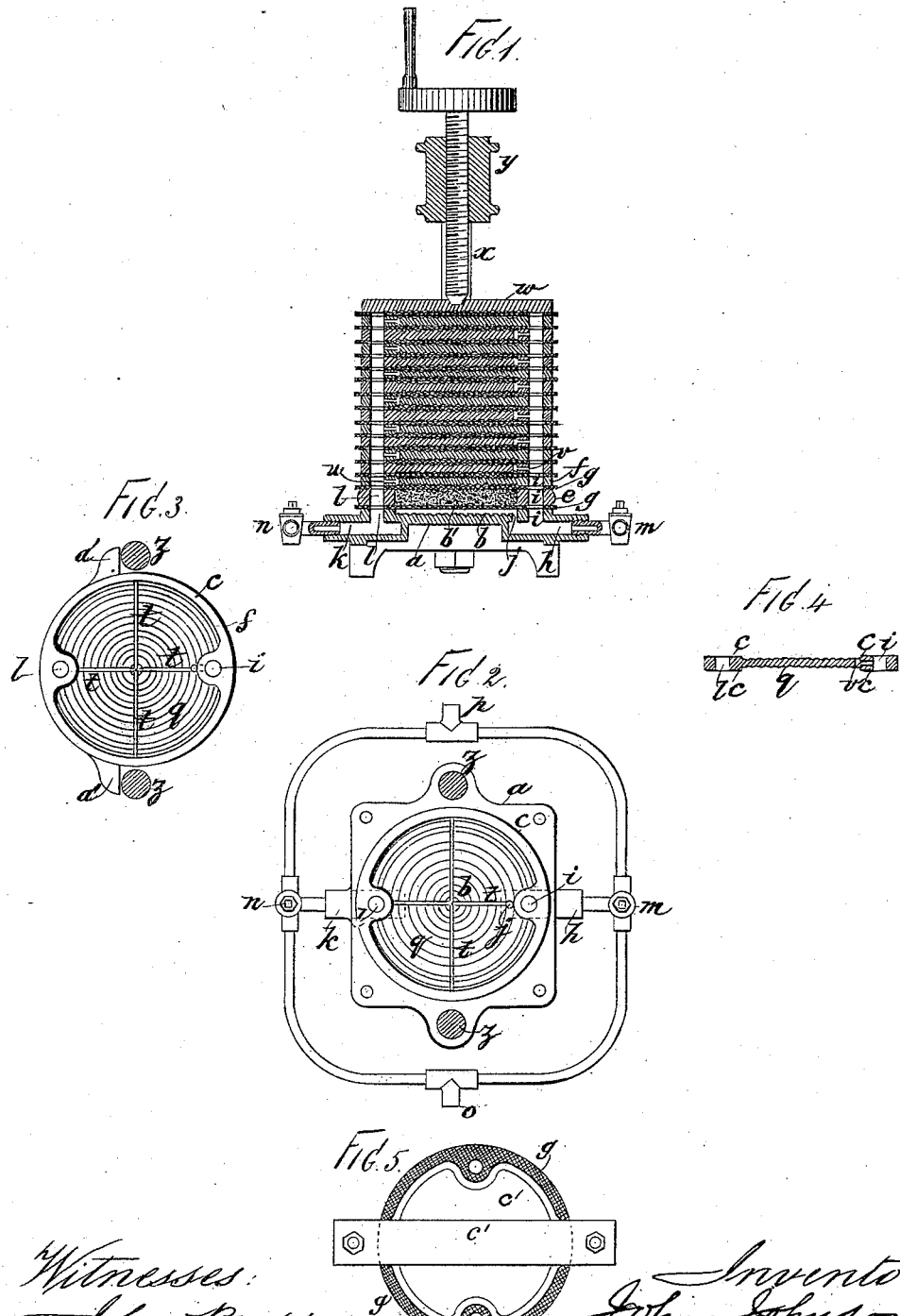

(No Model.) 2 Sheets—Sheet 2.

J. JOHNSON.
WATER FILTER.

No. 294,133. Patented Feb. 26, 1884.

Witnesses
O. J. Morgan.
B. H. Morgan,

John Johnson
Inventor
By A. P. Thayer
Attorney.

UNITED STATES PATENT OFFICE.

JOHN JOHNSON, OF BROOKLYN, NEW YORK.

WATER-FILTER.

SPECIFICATION forming part of Letters Patent No. 294,133, dated February 26, 1884.

Application filed August 6, 1883. (No model.)

*To all whom it may concern:*

Be it known that I, JOHN JOHNSON, a subject of Great Britain, residing at Brooklyn, in the county of Kings and State of New York, have invented new and useful Improvements in Water-Filters, of which the following is a specification.

My invention consists of an improved arrangement of the inlet and outlet passages in a series of filtering-chambers contrived for affording large area of filtering medium in a given space, and therefore large capacity and great efficacy in proportion to the size of the filter.

It also consists of an improved arrangement of apparatus for reversing the flow of the water for washing out the precipitate from time to time, to relieve the filtering medium of obstructions and to clean out the filter; and it also consists of an improved contrivance of the sheets of paper, felt, or other filtering medium employed to adapt them to pack the joints of the case in which the said filtering-chambers are formed, for preventing leak at the joints, all as hereinafter fully described, reference being made to the accompanying drawings, in which—

Figure 1 is a sectional view of a filter constructed according to my invention. Fig. 2 is a horizontal section and plan view of the base of the filter. Fig. 3 is a plan view of one of the plates employed for supporting the filtering medium. Fig. 4 is a section of Fig. 3, and Fig. 5 is a plan view of a clamp containing a sheet of the filtering material, and showing the method of preparing the sheets for the filter by waterproofing the edges that are clamped between the plates of the filtering-chambers, to fill the pores or cells and prevent the filtering of the water out through the joints of the chambers. Fig. 6 is a detail in sectional elevation, on a larger scale, to show the invention more clearly and to represent more fully the facility afforded by my arrangement of using charcoal or equivalent material, together with filtering-disks of paper.

The case forming the filtering-chambers is made substantially in the form of an ordinary filter-press, consisting of a head or base, $a$, having a corrugated surface similar to the plates forming a shallow chamber, $b$, in the face, surrounded by an annular flange, $c$, truly surfaced for making a tight joint with a ring, $e$, or a plate, $f$, when ring $e$ is not used, and a packing consisting of the outer margin of a disk, $g$, of paper, felt, or other suitable filtering material. This base or head has an inlet passage, $h$, formed in the edge, and extending inward a little beyond the inner edge of flange $c$, from which a large passage, $i$, extends up through the flange, to communicate with a similar passage, $i$, through the ring $e$ or plate $f$ above, the filter being sometimes used with a ring and sometimes without. There is also a smaller passage, $j$, extending up from inlet $h$ into chamber $b$. The base $a$ also has an outlet-passage, $k$, opposite to inlet-passage $h$, from which a passage, $l$, extends up through flange $c$, to communicate with a similar passage, $l$, through the ring $e$ or the plate $f$ if the ring is not used; but this passage $k$ has no communication with chamber $b$. These passages $h$ and $k$ are controlled by three-way cocks $m$ and $n$, respectively, with which the supply-pipe $o$ and the discharge-pipe $p$ are connected.

When I want to use charcoal or other material for chemical effect, I employ a ring, $e$, together with the paper or other disks $g$, between the base and the plate $f$ next above, and between the other plates $f$; but when that is not required, the rings are dispensed with, and the plates and disks of paper, felt, or other material are arranged alternately, one above another, in any number, according to the capacity required. The bottom of chamber $b$ and the sides of the plates $f$ have the annular grooves $q$ and radial grooves $t$, to allow the water to circulate and spread over the whole surface of the plates $f$, to utilize the whole breadth of the filtering-disks. The plates $f$ have marginal flanges $c$, similar to the flange of base $a$, to clamp the paper or felt disks, said flanges being slightly higher than the grooved inner surfaces of the plates, so that the filtering-disks will not be compressed except between the marginal turned-joint surfaces. The plate $f$ next above the ring $e$, or bottom $b$ when ring $e$ is not used, has a T-shaped passage, $u$, forming an outlet from both of its sides into passages $l$, and the second plate above said ring has a similar T-shaped passage, $v$, forming an inlet to both sides of it from the passages $i$.

The successive plates above are alternately provided with inlet and outlet passages. Over the top of the series of plates is a follower, $w$, with a binding-screw, $x$, above to clamp the plates together, the screw being fitted in a cross-head, $y$, supported on rods $z$, attached to the base. The rings $e$ and the plates $f$ have lugs $a'$, projecting from the edge, to bear against the rods $z$ for gages, by which to set the plates properly in the filter. The plates $f$ are all made alike; but in placing them in the filter they are alternately reversed by placing the lugs $a'$ on the opposite sides of the rods $z$, to adjust them according as the passages are to be inlets or outlets.

It will be seen that the water entering chamber $b$ through passage $j$ will pass through the charcoal $b'$ when used; also, through the sheets $g$ of paper and out through the passage $u$ of the plate $f$ above; also, that the water entering the inlets $v$ of the plates will pass through the filtering-disks above and below the plates having the inlets, and out of the passages $u$ of the alternate plates. Thus a very large area of filtering medium is provided within a small case, and it will also be seen that by reversing the three-way cocks, so that the water enters at K and discharges at $m$, the water will flow the reverse way through the filter, and will wash out the precipitate whenever it may be required, a few minutes of the back flow being sufficient to carry off the sediment and effectually cleanse the filtering medium. The filter is adapted to be connected in the service-pipe, so that the water flowing into the house will pass through the filter, and will issue from the faucets thoroughly filtered, and will be delivered under pressure.

To prevent leakage at the joints when using very porous or thick filtering medium, I propose to make said filtering medium water-proof at the margin, and for this purpose may clamp the disks between clamping-plates $c'$, adapted to protect the inner portions through which the water is to flow, but allowing the margins to project, so that they will be saturated with any suitable waterproofing material with which they may be treated.

I do not confine myself to any particular method of treating the disks, nor to any particular kind of waterproofing material; and I propose to use the filter for any other liquid for which it is applicable.

It is to be understood that the rings $e$ are only to be used when it is desired to make wider spaces for the employment of charcoal or other equivalent filtering material, together with the paper disks for chemical effect; and when they are used a ring, $e$, and its charcoal filling will be placed between each two plates, $f$, in succession—that is, the rings and plates will be arranged alternately. The disposition of the plates $f$ with relation to each other and with the inlet passages $i$ and outlets $l$ will be the same, and the operation of the filter will be the same, except that in one case the water will be filtered through the paper only, and in the other through the charcoal and paper also. In Fig. 1 only one ring, $e$, with its charge of charcoal, is represented, to illustrate the filter with and without charcoal in one figure; but in Fig. 6 the alternate arrangement of the rings and plates is represented.

What I claim, and desire to secure by Letters Patent, is—

1. The combination, in a filter, of a series of plates, $f$, and filtering-disks $g$, said plates having inlets $i$ and outlets $l$, with which the filtering-chambers connect, respectively, by the alternate passages $v$ and $u$ in the plates, substantially as described.

2. The combination, in a filter, of a series of plates, $f$, rings $e$, filtering-disks $g$, and layers of filtering material $b'$, said plates having inlets $i$ and outlets $l$, with which the filtering-chambers connect, respectively, by alternate passages $v$ and $u$ in the plates, substantially as described.

3. The combination, in a filter, of a series of plates, $f$, and filtering-disks $g$, said plates and disks having passages $i$ and $l$, and said disks having passages $v$ and $u$ alternately, as described, and means for reversing the flow of water through said plates and filtering-disks, as specified.

4. The combination, in a filter, of a series of plates, $f$, filtering-disks $g$, supply-pipe $o$, discharge-pipe $p$, and the three-way cocks $m$ $n$, said plates having inlets $i$ and outlets $l$, with which the filtering-chambers connect, respectively, by alternate passages $v$ and $u$ in the plates, substantially as described.

5. The combination, with plates $f$, of filtering-disks $g$, of paper, felt, or other material, having water-proof margins to be clamped between said plates, substantially as described.

In witness whereof I have hereunto signed my name in the presence of two subscribing witnesses.

JOHN JOHNSON.

Witnesses:
 W. J. MORGAN,
 S. H. MORGAN.